United States Patent
Zeng et al.

(10) Patent No.: US 8,212,874 B2
(45) Date of Patent: Jul. 3, 2012

(54) AUTOMATIC CAMERA CALIBRATION USING GPS AND SOLAR TRACKING

(75) Inventors: Shuqing Zeng, Sterling Heights, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 12/604,963

(22) Filed: Oct. 23, 2009

(65) Prior Publication Data

US 2011/0096165 A1    Apr. 28, 2011

(51) Int. Cl.
H04N 7/18 (2006.01)
G06F 7/00 (2006.01)

(52) U.S. Cl. .......................................... 348/148; 701/49

(58) Field of Classification Search .................. 348/114, 348/118, 135; 296/97.2, 97.4, 97.6, 97.8; 701/216; 382/365
See application file for complete search history.

(56) References Cited

U.S. PATENT DOCUMENTS

| 6,811,201 | B2 | 11/2004 | Naik |
| 7,337,650 | B1 * | 3/2008 | Preston et al. ................. 73/1.38 |
| 2002/0198632 | A1 * | 12/2002 | Breed et al. ....................... 701/1 |
| 2007/0210604 | A1 | 9/2007 | Lin |
| 2009/0326816 | A1 * | 12/2009 | Park et al. ..................... 701/213 |

OTHER PUBLICATIONS

Wende Zhang et al., Utility U.S. Appl. No. 12/432,573, filed Apr. 29, 2009, entitled "Active Face Shade Detection in Auto Sun-Shade System".

* cited by examiner

*Primary Examiner* — David Ometz
*Assistant Examiner* — Carramah J Quiett
(74) *Attorney, Agent, or Firm* — John A. Miller; Miller IP Group, PLC

(57) ABSTRACT

A system and method for automatically calibrating the aiming direction of a camera onboard a vehicle. The method uses GPS and solar almanac data to estimate the location of the sun relative to the vehicle, and compares this to the solar position in an image from the camera. The comparison is performed with an ongoing recursive calculation which yields an improved estimate of the sun position relative to the vehicle, while simultaneously calibrating the aiming direction of the camera. The aiming calibration data is used to improve the accuracy of the camera's images as used for all of the camera's other functions.

13 Claims, 5 Drawing Sheets

AUTOMATIC CAMERA CALIBRATION USING GPS AND SOLAR TRACKING

BACKGROUND OF THE INVENTION

1. Field of the Invention

This invention relates generally to onboard vehicle camera systems and, more particularly, to a method and system for calibrating the aiming direction of a forward-looking camera on a vehicle that uses a Global Positioning System-based calculation of solar position relative to the vehicle and a camera-based determination of solar position relative to the vehicle as input, and performs an ongoing recursive calculation using a Kalman filtering algorithm to determine the azimuth and pitch angles of misalignment between the camera's aiming direction and the vehicle's true straight-ahead direction.

2. Discussion of the Related Art

Most vehicles are equipped with a sun visor that can be selectively flipped down from a stored position if the vehicle is traveling into a low sun angle, so that the driver is not staring directly into the sun. The sun visor is typically able to block the sun shining through the windshield, as well as through the windows. The sun visor makes the driving experience more pleasant, and also has an obvious safety value.

Systems have been developed in the art to automatically adjust the position of a sun blocker in response to a sun incident angle. For example, U.S. Pat. No. 6,811,201, titled, Automatic Sun Visor and Solar Shade System for Vehicles, issued Nov. 2, 2004 to Naik, discloses an automatic sun visor system for a vehicle that includes a light detecting apparatus for detecting sunlight incident on the face of a driver of the vehicle, and adjusts the sun visor in response to the detected sunlight on the face of the driver.

However, many of the automatic sun visor controllers available on the market require the use of expensive cameras, sensors, or other hardware dedicated to the purpose of controlling the sun visor. This discourages the use of those systems in moderately priced vehicles. A need exists for a lower cost sun visor control system, which takes advantage of commonly-available sensors and systems on a vehicle and uses them to determine the optimum position of the sun visor.

Modern vehicles sometimes include one or more cameras that provide back-up assistance, take images of the vehicle driver for determining driver drowsiness or attentiveness, provide images of the road as the vehicle is traveling for collision avoidance purposes, provide structure recognition, such as roadway signs, etc. For those applications where the camera image is analyzed for purposes such as safety warnings, it is critical to accurately calibrate the position and orientation of the camera with respect to the vehicle. Because of manufacturing tolerances, a separate end-of-line camera calibration, or aftermarket camera adjustment, must be performed on each vehicle for such things as accurate overlay of predicted vehicle path lines.

Some known camera systems do not provide camera calibration, but revert to a default value that may provide a couple of degrees of error. Other camera systems provide a pre-calibration approach where points on the camera image are hand-labeled and feature point locations are hand-measured in the vehicle coordinates, such as by providing a checker board pattern of the image. However, these calibration techniques are typically time consuming and must be performed at a service location. Therefore, if the vehicle is traveling and hits a bump or some other obstacle in the road, the camera position could be altered, and the calibration would not be accurate until the vehicle was taken to the service location to be corrected.

Camera calibration involves determining a set of parameters that relate camera image coordinates to world coordinates and vice versa. Some camera parameters, such as camera focal length, optical center, etc., are stable, while other parameters, such as camera orientation and position, are not. And even a small change in camera yaw or pitch angle relative to the vehicle can have a large influence on a system such as a lane departure warning. Therefore, what is needed is a camera calibration process that automatically calibrates camera orientation parameters as the vehicle is being driven where the vehicle-camera system continually adapts itself over time.

SUMMARY OF THE INVENTION

In accordance with the teachings of the present invention, a method and system are disclosed for automatically calibrating the aiming orientation of a camera onboard a vehicle. The method includes using an onboard Global Positioning System (GPS) receiver in conjunction with solar almanacs to predict the position of the sun relative to the vehicle. This GPS-based solar position can be compared to the sun position as determined by the onboard camera. Ongoing recursive calculations compare GPS-based sun position data with camera-based sun position data to yield aiming calibration parameters for the camera, which are useful for the camera's other functions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for automatically calibrating the aiming direction of a camera on a vehicle is merely exemplary in nature, and is in no way intended to limit the invention or its applications or uses.

As mentioned above, automatic sun visor control systems known in the art and available on the market typically require dedicated cameras, sensors, or other hardware in order to operate, thus raising the cost of the system. The present invention proposes a system and method for controlling the position of an automatic sun visor in a vehicle, using commonly existing onboard systems and sensors to provide a low-cost yet robust sun visor controller. Specifically, the present invention uses Global Positioning System (GPS) data and vehicle dynamics sensors to determine the position of the sun relative to the vehicle, a forward-looking camera to fine-tune the GPS-based sun position data, a light intensity meter to determine if the sun is actually shining on the vehicle, and driver side view mirror position or a driver-viewing camera to estimate the position of the driver's eyes to optimally position the sun visor. In addition, the calculation which compares GPS-based sun position to forward-looking camera-based sun position also yields data about the aiming calibration of the forward-looking camera.

Figure 1:
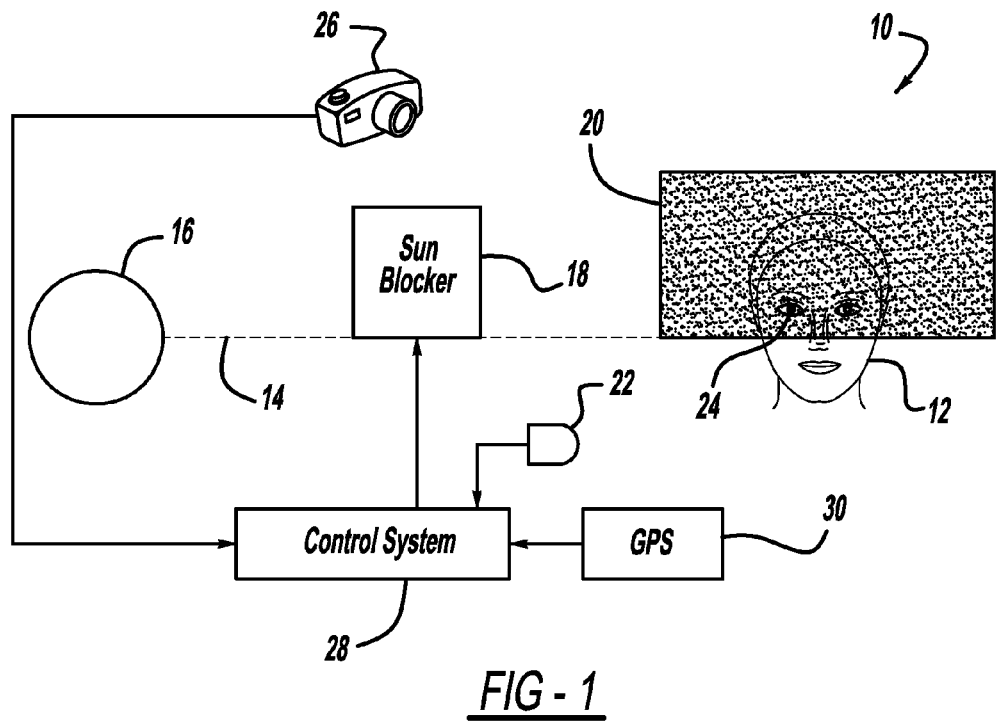
FIG. 1 is an illustration of a system for automatically positioning a sun blocker to shield a driver's face from the sun.

FIG. 1 is an illustration of a system 10 for automatically positioning a sun blocker 18 to shield a vehicle driver 12. A light ray 14 from a light source such as the sun 16 is directed towards the vehicle driver 12, such as through the vehicle windshield or side window. The sun blocker 18 is positioned between the sun 16 and the driver 12 within the vehicle and causes a shadow 20 to be formed, where it is desirable to maintain the blocker 18 in a position where eyes 24 of the driver 12 are within the shadow 20. As the vehicle is driven and the position of the sun 16 moves relative to the driver, a control system 28 automatically positions the blocker 18 to provide the shadow 20 at the proper location. As will be discussed in detail below, the control system 28 receives inputs from various sources to determine the position of the sun blocker 18. The sources include a GPS receiver 30, a camera 26 and a light intensity sensor 22. The camera 26 can be any camera suitable for the purposes described herein, including low cost cameras.

Figure 2:
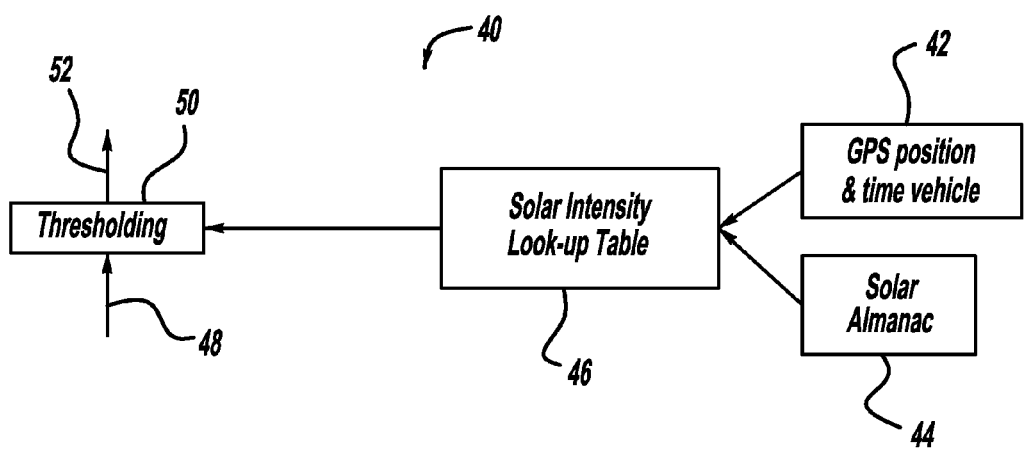
FIG. 2 is a block diagram of a system for determining whether the sun is actually shining on a vehicle at any given time, versus a cloudy or shaded condition.

FIG. 2 is a block diagram of a system 40 that determines whether the sun is actually out and shining on the vehicle at any given time as may be prevented by cloudy or shady conditions. The system 40 determines whether the automatic deployment of the sun visor is necessary. The system 40 begins with GPS position and time inputs at box 42 from the GPS receiver 30. The GPS receiver 30 provides information about the vehicle's position on earth, and the time of day and time of year. The GPS position and time inputs can be used in conjunction with a solar almanac database 44 and a solar intensity look-up table 46 to determine the predicted solar irradiation intensity. The resulting predicted intensity $I_p$ provided by the look-up table 46 represents the intensity of solar irradiation that would be expected at the current vehicle location, at the current time, if there were no occlusion of the sun from the vehicle. The predicted intensity $I_p$ can then be compared to an actual intensity $I_a$ on line 48 by a thresholding comparator 50. The actual intensity $I_a$ on the line 48 is measured by the light intensity sensor 22, such as an LED or a forward-looking camera. In the thresholding comparator 50 the determination is made that it is sunny if the actual intensity $I_a$ exceeds the predicted intensity $I_p$ by some threshold amount. This determination, sunny or not, is updated continuously during vehicle operation, and is used as a form of master switch to control whether the automatic sun visor positioning system is to be activated or not on line 52. If it is sunny, the sun visor controller is enabled.

Figure 3:
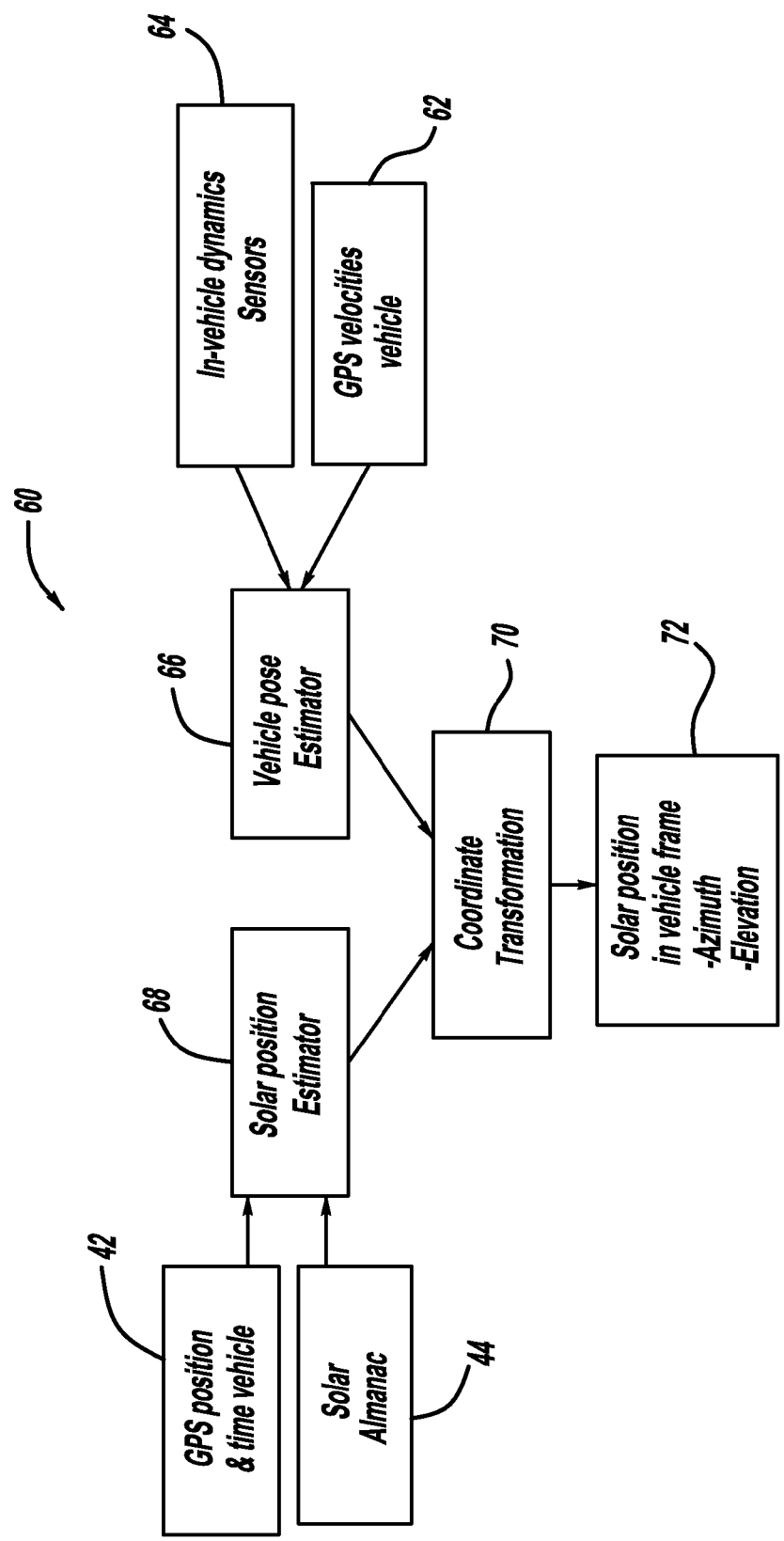
FIG. 3 is a block diagram of a system for estimating the position of the sun relative to the vehicle using GPS and other data.

FIG. 3 is a block diagram of a system 60 that determines the position of the sun 16 relative to the vehicle, where like elements to the system 40 are identified by the same reference numbers. The system 60 begins with GPS velocity inputs at box 62 from the GPS receiver 30. The GPS velocity inputs include vehicle velocity data which define the heading of the vehicle. Vehicle dynamics inputs from onboard vehicle dynamics system sensors 64 provide additional information about vehicle orientation, such as yaw rate and roll or bank angle. The GPS velocity inputs and the vehicle dynamics inputs are used in a vehicle pose estimation processor 66 to determine the current vehicle orientation in a coordinate frame which is defined as having its origin at the center of the vehicle, its X axis pointed due East, its Y axis pointed due North, and its Z axis pointed up. The vehicle orientation includes the compass heading or yaw position of the vehicle, as well as the pitch and bank angles of the vehicle relative to a horizontal plane.

Simultaneous to the calculation of the vehicle orientation by the processor 66, the position of the sun 16 is also being determined. A solar position estimation processor 68 determines the current sun ray direction in the same East-North-Up coordinate frame described previously to define the vehicle orientation. The processor 68 receives GPS position and time data from the box 42 and solar almanac data from the database 44 to calculate the solar position estimation. The vehicle orientation and the sun ray direction are then used in a coordinate transformation processor 70 to determine the GPS-based solar position in the vehicle coordinate frame at box 72. This GPS-based solar position in vehicle coordinate frame at the box 72 includes the azimuth and elevation angles of the sun relative to the vehicle, and is exactly the information needed to determine whether the sun is in a position requiring deployment of the automatic sun visor.

The following is a detailed explanation of the calculations and variables used in the system 60. The algorithm requires the following data. Global Positioning System time (GT), which is the atomic time scale implemented by the atomic clocks in the GPS ground control stations and the GPS satellites themselves. GPS time was zero at 0 h 6 Jan. 1980 and since it is not affected or altered by leap seconds, GPS is now ahead of UTC by 15 seconds. GT includes Year Y, day of year D, hour H, minute M, and second S. Here the day of the year is 32 for February 1, as an example. Longitude θ and latitude φ (in radians). Vehicle heading angle α (radians) in the horizontal plane and tilt angle η (radians). Pressure P (in millibars) and Temperature T (in ° C.).

The output of the algorithm includes two angles with respect to the bore-sight of the vehicle and irradiance intensity:

1) The sun's azimuth angle ($α_G$);
2) The refraction corrected elevation angle ($e_G$); and
3) The predicted extraterrestrial irradiance on the surface of the vehicle (i.e., roof) (etrtilt).

The steps of the estimation algorithm are listed as follows, where the angles are in radians:

1) Day angle:

$$dayang = \frac{2\pi(D-1)}{365.0};$$

and

2) Extraterrestrial (top-of-atmosphere) Earth radius vector multiplied to solar constant;

$$erv = 1.000110 + 0.034221 \cos(dayang) + 0.00128 \sin(dayang) + 0.000719 \cos(2 dayang) + 0.000077 \sin(2 dayang) \quad (1)$$

3) Universal time (in hours):

$$UT = H + \frac{M}{60} + \frac{s}{3600} + \Delta GPS \quad (2)$$

4) Julian day (valid for the year 1950-2050):

$$julday = 32916.5 + 365(Y - 1949) + \frac{Y - 1949}{4} + D + UT \quad (3)$$

5) Time used in the calculation of the ecliptic coordinates:

$ectime=julday-51545.0$ (4)

6) Mean longitude:

$mnlong=4.894950+0.01720279\times ectime$ (5)

7) Mean anomaly:

$mnanom=6.240041+0.0172097\times ectime$ (6)

8) Ecliptic longitude:

$eclong=mnlong+0.03342 \sin(mnanom)+0.0003491 \sin(2mnanom)$ (7)

9) Obliquity of the ecliptic:

$$ecobli = \frac{(23.439 - 4.0 \times 10^{-7} ectime)\pi}{180} \quad (8)$$

10) Declination:

$declin=\sin^{-1}(\sin(ecobli)\sin(eclong))$ (9)

11) Right ascension:

$rascen=a \tan 2(\cos(ecobli)\sin(eclong), \cos(eclong))$ (10)

12) Greenwich mean side real time:

$gmst=6.697375+0.0657098242\times ectime+utime$ (11)

13) Local mean side real time:

$lmst=0.261799387\times gmst+\theta$ (12)

14) Hour angle: $hrang=lmst-rascen$;
15) Solar elevation angle, no atmospheric correction:

$c_z=\sin(declin)\sin(\phi)+\cos(declin)\cos(\theta)\cos(hrang)$ (13)

$$elevetr = \frac{\pi}{2} - \cos^{-1}(c_z) \quad (14)$$

16) Solar azimuth angle:

$$c_a = \frac{\sin(elevetr)\sin(\phi) - \sin(declin)}{\cos(elevetr)\cos(\phi)} \quad (15)$$

$azim=\pi-\cos^{-1}(c_a)$ (16)

17) Refraction correction: If the sun is near zenith (i.e., elevetr>85°, no refraction is needed. Otherwise, the correction refcor is computed as:

$t_e=\tan(elevetr)$ (17)

$$a_e = \frac{elevetr \times \pi}{180} \quad (18)$$

$$refcor' = \begin{cases} \frac{58.1}{t_e} - \frac{0.07}{t_e^3} - \frac{0.000086}{t_e^3} \\ 1735 + a_e(-518.2 + a_e(103.4 + a_e(-12.79 + 0.711a_e))) \\ \frac{-20.774}{t_e} \end{cases} \quad (19)$$

$$refcor = \frac{283P}{3600 \times 1013(273 + T)} refcor' \quad (20)$$

18) The corrected elevation:

$elevref=elevetr-refcor$ (21)

19) The extraterrestrial (top-of-atmosphere) global irradiance (etrtilt) on the tilted vehicle surface (W/m²):

$$zenref = \frac{\pi}{2} - elevref \quad (22)$$

$c_z=\cos(zenref)$ (23)

$etrn=1367\times c_z$ (24)

$f_t=c_z\cos(\eta)+\sin(zenref)\sin(\eta)(\cos(azim)\cos(\alpha)+\sin(azim)\sin(\alpha))$ (25)

$etrtilt=f_t\times etrn$ (26)

20) The incident angles with respect to the vehicle frame:

$\alpha_G=azim-\alpha$ (27)

$e_G=elevref-\eta$ (28)

The angles $\alpha_G$ and $e_G$ are the azimuth and elevation angles, respectively, which represent the GPS-based solar position in the vehicle coordinate frame.

Figure 4:
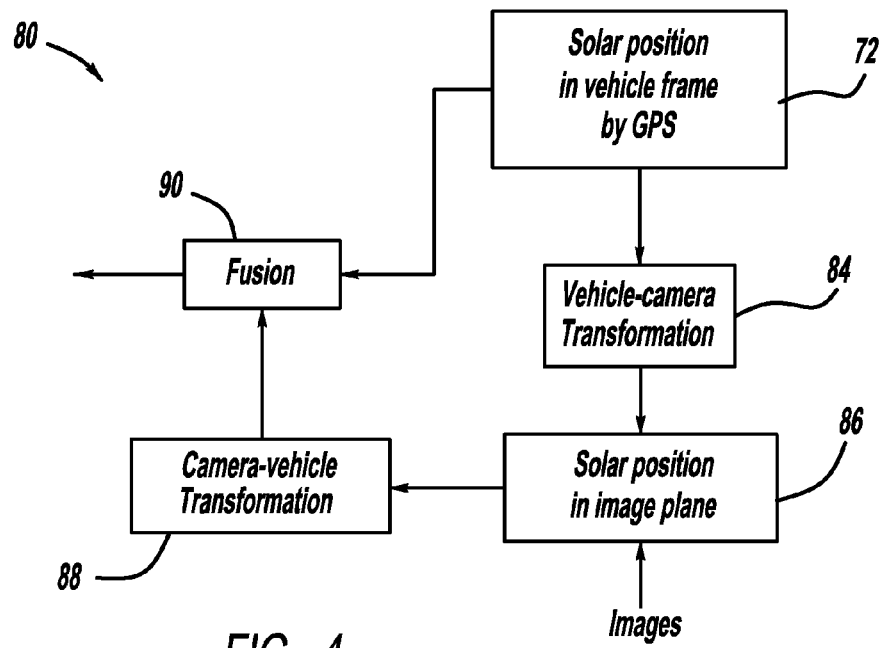
FIG. 4 is a block diagram of a system for refining the estimate of the position of the sun relative to the vehicle using both GPS data and a forward-looking camera image.

FIG. 4 is a block diagram of a system 80 that provides data fusion that can be used to refine the calculated position of the sun relative to the vehicle while simultaneously calibrating the aiming direction of an onboard forward-looking camera, where like elements to the system 60 are identified by the same reference numbers. The system 80 uses GPS-based solar position in the vehicle coordinate frame at the box 72, which is determined as explained above. The GPS-based solar position in vehicle coordinate frame is sent through a vehicle-camera coordinate transformation at box 84, to yield the approximate location of the sun in the coordinates of the image plane of the forward-looking camera 26. This information can be used to isolate a small portion of the image plane of the camera 26, and within this small portion, the solar position can be determined by identifying the most highly light-saturated patch of the image. This gives the solar position in the image plane at box 86. The solar position in the image plane is sent through a camera-vehicle coordinate transformation at box 88 to return it to vehicle coordinates, where it is used in a fusion calculation processor 90. The fusion calculation processor 90 calculates an improved solar position and the extrinsic calibration parameters of the camera 26 as will be described in detail below.

The following is a detailed explanation of the fusion calculation in the processor 90. The algorithm requires the following data as the inputs. The known camera intrinsic parameters including: focal length, where the focal length is in pixels $[f_u, f_v]$; optical center $[c_u, c_v]$; skew coefficient defined by the angle between the x and y pixel axes is stored in the scalar $\alpha_c$; and the image distortion coefficients (radial and tangential distortions) are stored in the vector $k_c$ with dimension five. Sun incident angles in the vehicle frame of azimuth ($\alpha_G$) and elevation ($e_G$). Sun position in the image plane (the center of the saturation area): row ($u_s$) and column ($v_s$). The origin pixel locates at the bottom left corner.

The outputs of the algorithm are the improved solar position in vehicle coordinate frame, azimuth ($\alpha_F$) and elevation ($e_F$); and the camera's extrinsic calibration parameters (i.e., the orientation angles in the vehicle frame), azimuth ($\alpha_C$) and elevation ($e_C$).

The core part of the algorithm is Kalman filtering that simultaneously estimates the incident angles and the camera's extrinsic parameters. The state vector is defined as $x=(\alpha_F, e_F, \alpha_G, e_G)$.

The state dynamic model is:

$$x(t+1)=x(t)+Gw \quad (29)$$

Where:

$$G = \begin{bmatrix} 0 & 0 \\ 0 & 0 \\ 1 & 0 \\ 0 & 1 \end{bmatrix} \quad (30)$$

Where $x(t+1)$ and $(x)t$ are the state vectors at time instants t and t+1, respectively, and w is a white Gaussian noise term distributed as $w \sim N(0,Q)$.

Let the measurement vector at time instant t be $o=(\alpha_G, e_G, u_s, v_s)$ and let:

$$x=\tan(\alpha_G-\alpha_C) \quad (31)$$

$$y=\tan(e_G-e_G) \quad (32)$$

$$r=\sqrt{(x^2+y^2)} \quad (33)$$

$$x_d=(1+k_C(1)r^2+k_C(2)r^4+k_C(5)r^6)x+2k_C(3)xy+k_C(4)(r^2+2x^2) \quad (34)$$

$$y_d=(1+k_C(1)r^2+k_C(2)r^4+k_C(5)r^6)y+k_C(4)(r^2+2y^2)+2k_C(5)xy \quad (35)$$

The measurement model is given by:

$$\alpha_G=\alpha_F+v_\alpha \quad (36)$$

$$e_G=e_F+v_e \quad (37)$$

$$u_s=f_u(x_d+\alpha_c y_d)+c_u+v_u \quad (38)$$

$$u_s=f_u y_d+c_u+v_u \quad (39)$$

Or in vector form as:

$$o=h(x)+v \quad (40)$$

Where $v=(v_\alpha, v_e, v_u, v_v)$.

The measurement equation (40) can be linearized in the neighborhood $x^*$ by Taylor expansion as:

$$o \approx H_t x+h(x^*)-H_t x^*+v \quad (41)$$

Where $H_t$ denotes the Jacobian with respect to x near the point $x^*$ at time instant t.

In summary, the following procedure based on Kalman filtering is used to jointly estimate the incident angles and the camera's extrinsic parameters.

(1) Randomly choose small numbers to initialize the camera's extrinsic parameters $\alpha_{G_0}$ and $e_{G_0}$. Combining with the first GPS-based incident estimate ($\alpha_{G_0}, e_{C_0}$), gives $x(0)=(\alpha_{G_0}, e_{G_0}, \alpha_{C_0}, e_{C_0})$ and choose a covariance matrix P(0).

(2) When the new measurement at time instant t arrives, we write the previous state vector as $x(t-1)$. The predicted state at this time instant can be written as $\tilde{x}(t)=x(t-1)$, and the covariance matrix $\tilde{P}(t)=P(t-1)+GQG^T$.

(3) Let the measurement at time instant t be o. Thus, the update state vector at time instant t is $$e=o-h(\tilde{x}(t))$$

$$S=H_t\tilde{P}(t)H_t^T+R_t$$

$$K=\tilde{P}(t)H_t^T S^{-1}$$

$$\hat{x}(t)=\tilde{x}(t)+Ke$$

$$P(t)=(I-KH_t)\tilde{P}(t)$$

(4) Go to Step 2.

Thus, the fusion calculation processor 90 yields both an improved solar position in the vehicle coordinate frame, and the camera's extrinsic calibration parameters.

Figure 5:
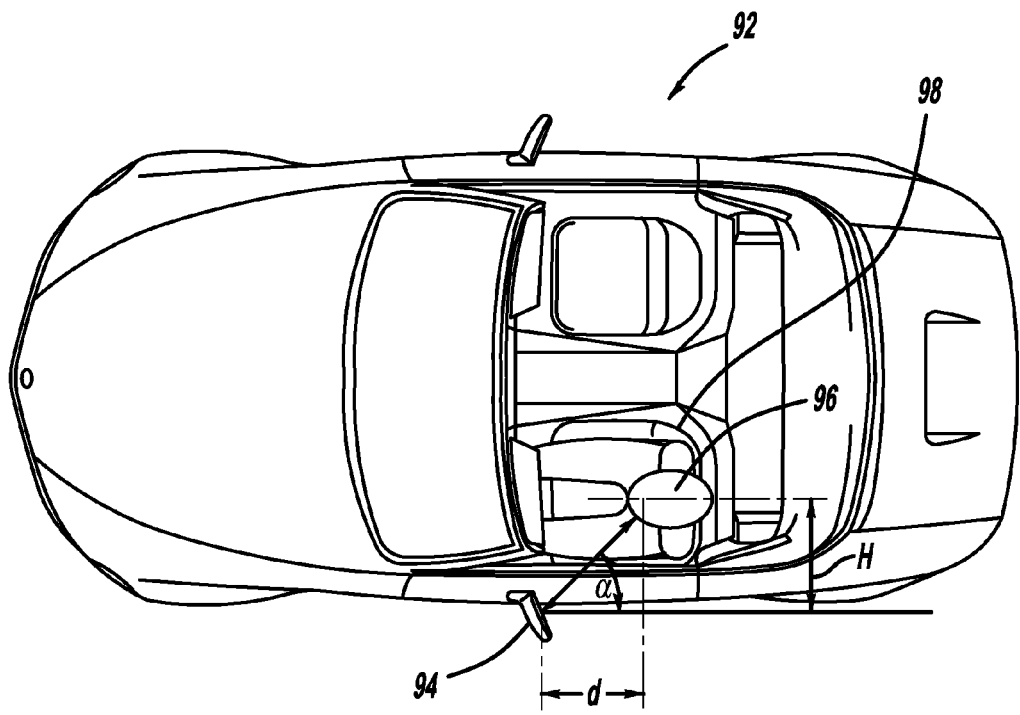
FIG. 5 illustrates how the angular position of the driver side view mirror can be used to estimate the position of the driver's eyes in the vehicle coordinate frame.

FIG. 5 is an illustration of a vehicle 92 that shows how the angular position of a driver side view mirror 94 can be used to estimate the position of the eyes of a driver 96. Most modern vehicles are equipped with position encoders in the side view mirrors. These position encoders are used in systems which store seat and mirror position information in driver profiles. These seat and mirror positions can then be recalled at the push of a button, for driver number 1, driver number 2, etc. The mirror position encoders can be used to determine the driver side view mirror angle α, which is the angle in the plan view between a fore-aft vector through the driver side view mirror 94 and a vector from the driver side view mirror 94 to the driver's eyes. The driver side view mirror angle α can be calculated as α=2(θ), where θ is the angle in the plan view between a fore-aft vector through the driver side view mirror 94 and a vector normal to the mirror 94, and θ is known from the mirror position encoder. Knowing the driver side view mirror angle α, and the distance H—which is the lateral distance between the center of the driver's side view mirror 94 and the centerline of a driver's seat 98, and is fixed for a given vehicle—the distance d can be calculated as d=H/tan(α). The distance d then represents the fore-aft distance from the driver side view mirror 94 to the driver's eyes, and can be used to compute a vector from the driver's eyes to the sun 16 in vehicle coordinates.

An alternate method of determining the position of the driver's eyes is to use a driver-viewing camera, for vehicles so equipped. Technology for detecting the eyes of the vehicle driver 96 via images from a driver-viewing camera is known in the art, and will not be explained further here. If the driver's eye position information is available from a driver-viewing camera, then it can be used in conjunction with or in place of the driver's eye position estimated from the driver's side view mirror position.

Figure 6A:
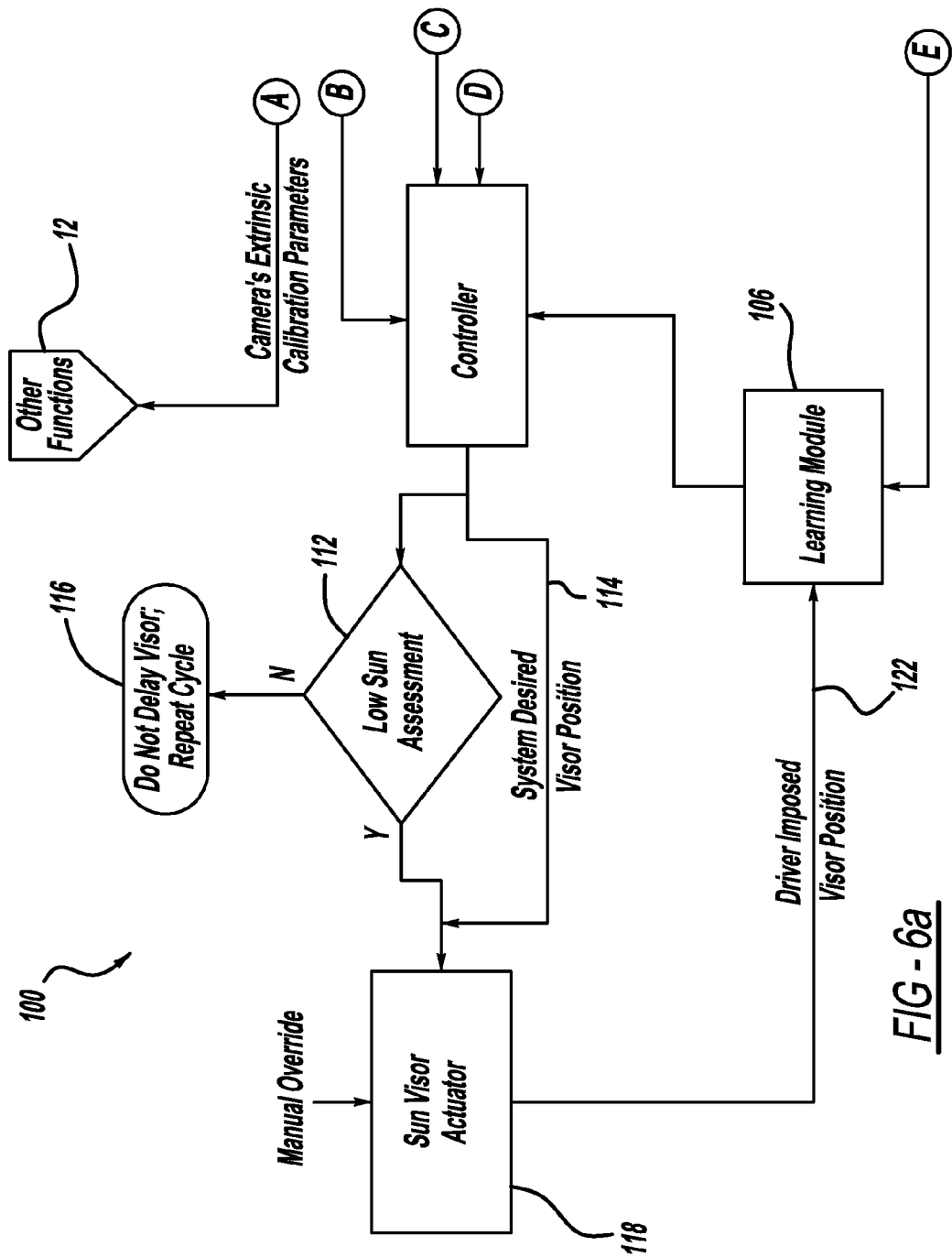
FIGS. 6a and 6b are a block diagram of a system for optimizing sun visor position and calibrating the aiming direction of a forward-looking camera.
Figure 6B:
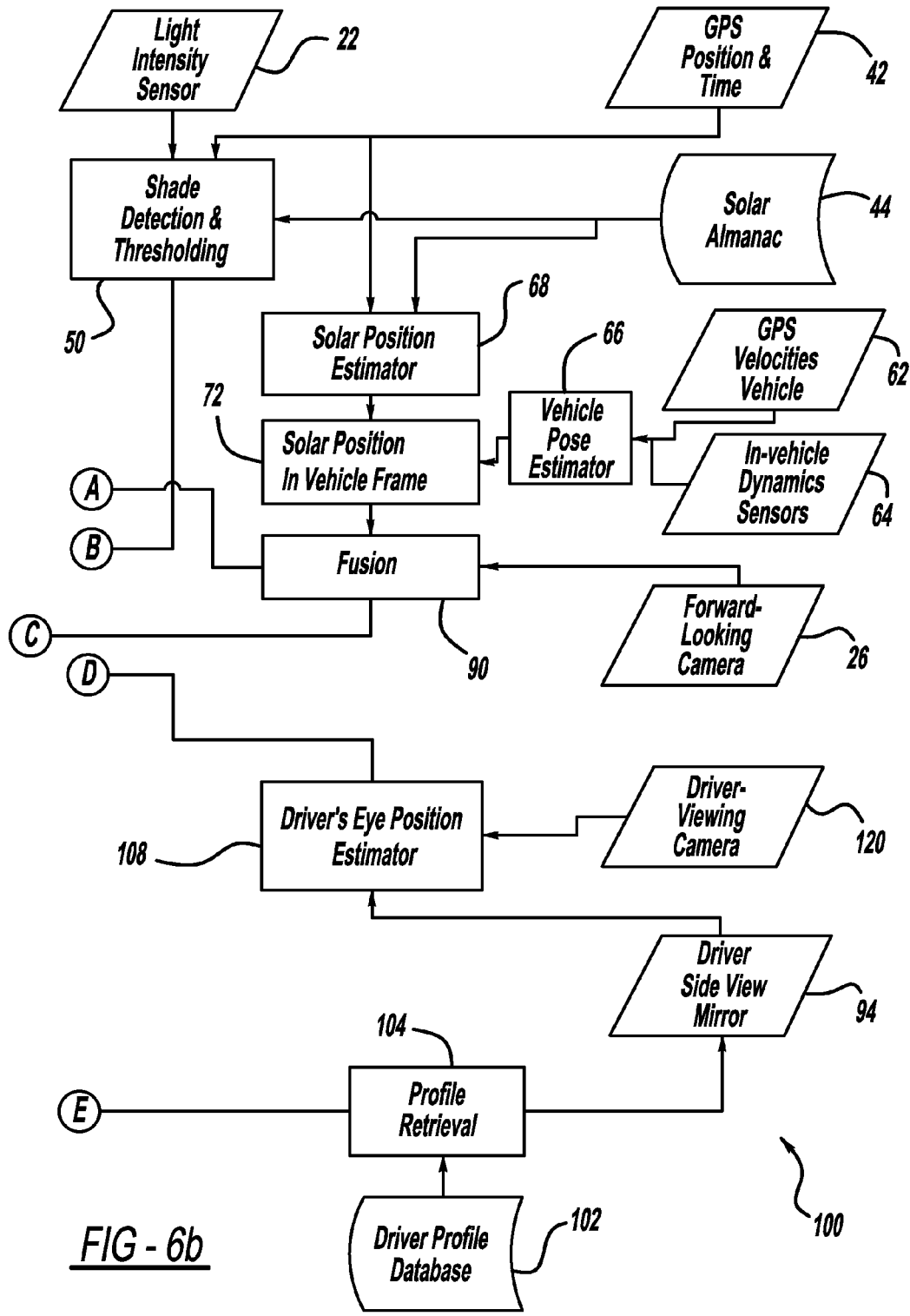

FIGS. 6a and 6b are a block diagram of a system 100 for optimizing the sun visor position and calibrating the aiming of the forward-looking camera 26, where like elements to the systems 10, 40, 60, and 80 have the same reference number. Driver profile information is stored in a driver profile database 102, and recalled through a profile retrieval 104. The profile retrieval 104 can be triggered by the driver pressing a button to identify himself or herself as driver number 1, driver number 2, etc., or the profile retrieval 104 can be triggered by some other sort of smart system such as biometric data, or a Radio Frequency ID (RFID) tag. The profile retrieval 104 provides information about driver identification to a learning module 106 which can be used to make final adjustments to the visor position if necessary. The profile retrieval 104 also adjusts driver side view mirror settings, and this information goes to a driver's eye position estimator 108, which works as described above. The driver's eye position estimator 108 can also receive input from a driver-viewing camera 120, if such a camera is available. The output of the driver's eye position estimator goes to a controller 110.

The solar position estimator 68 and the vehicle pose estimator 66, also described above, are used to determine an estimated solar position in vehicle coordinate frame at the box 72 based on GPS input. In a very low cost embodiment, the GPS-based solar position can be used directly by the controller 110. In another embodiment, in a vehicle equipped with the forward-looking camera 26, the fusion processor 90 is used to calculate an improved solar position as described previously. The solar position, either GPS-based or fusion-calculated, is sent to the controller 110. As described previously, the fusion processor 90 also calculates the camera's extrinsic calibration parameters, which can be used to improve the accuracy of any other function for which the forward-looking camera 26 is used—such as lane departure warnings, and object detection. Testing of a prototype system designed according to the disclosed method has shown that the camera's extrinsic calibration parameters, the azimuth and elevation angles of the camera's true aiming direction relative to the vehicle bore-sight or straight-ahead vector, converge to the correct values as time goes by during vehicle operation. The calibration parameters can be stored in a designated memory location of an onboard system, and used as input to adjust the images of the camera 26 as used for any other function.

The shade detection & thresholding processor 50, described above, is also operating and sending its output—sunny or shady—to the controller 110. Given the three inputs—driver's eye position, solar position, and sunny vs. shady—the controller 110 can determine what action, if any, should be applied to the sun visor.

The output of the controller 110 is twofold; first, a low sun assessment 112 indicating whether the sun is shining on the vehicle and in a position requiring the visor to be deployed; and second, a system desired visor position on line 114. If the low sun assessment 112 is No, then no visor deployment is commanded, and the controller continues to operate on a prescribed time cycle as shown in oval 116. If the low sun assessment 112 is Yes, then the controller 110 activates a sun visor actuator 118 based on the system desired visor position on the line 114.

It is possible for the driver to manually override the sun visor actuator 118 and move the visor to different position. Any such driver imposed visor position on line 122 is communicated to the learning module 106, which cumulatively stores this data along with the outputs of the profile retrieval 104 and the controller 110. The learning module 106 uses this data collectively to determine whether the current driver, in similar solar position conditions, has set a driver imposed visor position on line 122 which is different than the system desired visor position on the line 114. If so, then the difference between the driver imposed visor position on line 118 and the system desired visor position on the line 114 is sent to the controller 110, and is used to adjust the system desired visor position on the line 114. The system 100 continues to operate on a prescribed time cycle as long as the vehicle is running.

Depending on the type of systems and sensors available on any given vehicle, the methods disclosed above can provide capabilities ranging from a very low cost automatic sun visor positioning controller to a very robust sun visor controller and auto-calibrating forward-looking camera system.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calibrating an aiming direction of a camera, said method comprising:
   mounting a global positioning system receiver to a mobile platform, said mobile platform having a true straight-ahead direction;
   mounting the camera to the mobile platform; using data from the global positioning system receiver and a solar almanac database to create a first estimate of the position of the sun relative to the mobile platform;
   analyzing an image from the camera to create a second estimate of the position of the sun relative to the mobile platform;
   using the first and second estimates of the position of the sun relative to the mobile platform in an ongoing recursive calculation which yields a pitch angle and an azimuth angle of misalignment between the camera's aiming direction and the mobile platform's true straight-ahead direction, and
   using an improved estimate of the position of the sun relative to the mobile platform from the recursive calculation to control the position of a sun blocker.

2. The method according to claim 1 wherein the ongoing recursive calculation uses a Kalman filtering algorithm.

3. The method according to claim 1 wherein the mobile platform is a vehicle.

4. The method according to claim 1 wherein the camera is a forward-looking camera.

5. The method according to claim 1 further comprising using angles of misalignment between the camera's aiming direction and the mobile platform's true straight-ahead direction as calibration input for other functions of the camera.

6. A system for calibrating an aiming direction of a camera relative to a mobile platform, said system comprising:
   a Global Positioning System receiver mounted to the mobile platform, said mobile platform having a true straight-ahead direction;
   a first solar position estimator module which uses data from the Global Positioning System receiver and a solar almanac database to create a first estimate of the position of the sun relative to the mobile platform;
   a second solar position estimator module which analyzes an image from the camera to create a second estimate of the position of the sun relative to the mobile platform;
   a fusion module which uses the first and second estimates of the position of the sun relative to the mobile platform in an ongoing recursive calculation which yields a pitch angle and an azimuth angle of misalignment between the camera's aiming direction and the mobile platform's true straight-ahead direction; and
   a controller for positioning a sun blocker in response to an improved estimate of the position of the sun relative to the mobile platform from the fusion module.

7. The system according to claim 6 wherein the ongoing recursive calculation in the fusion module uses a Kalman filtering algorithm.

8. The system according to claim 6 wherein the mobile platform is a vehicle.

9. The system according to claim 6 wherein the camera is a forward-looking camera.

10. The system according to claim 6 further comprising a calibration data module for storing the angles of misalignment between the camera's aiming direction and the mobile platform's true straight-ahead direction and making the angles of misalignment available as a calibration input for other functions of the camera.

11. A self-calibrating system for a forward-looking camera on a vehicle, said system comprising:
- a Global Positioning System receiver mounted to the vehicle, said vehicle having a true straight-ahead direction and said camera having an aiming direction;
- a first solar position estimator module which uses data from the Global Positioning System receiver and a solar almanac database to create a first estimate of the position of the sun relative to the vehicle;
- a second solar position estimator module which analyzes an image from the camera to create a second estimate of the position of the sun relative to the vehicle;
- a fusion module which uses the first and second estimates of the position of the sun relative to the vehicle in an ongoing recursive calculation which yields a pitch angle and an azimuth angle of misalignment between the camera's aiming direction and the vehicle's true straight-ahead direction;
- a calibration data module for storing the angles of misalignment between the camera's aiming direction and the vehicle's true straight-ahead direction and making the angles of misalignment available as a calibration input to other functions of the camera; and
- a controller for positioning a sun blocker in response to an improved estimate of the position of the sun relative to the vehicle from the fusion module.

12. The self-calibrating system according to claim 11 wherein the fusion module uses a Kalman filtering algorithm for the ongoing recursive calculation.

13. The self-calibrating system according to claim 11 wherein the camera's other functions include lane departure warning and collision detection.

* * * * *